United States Patent
Humphrey

(10) Patent No.: US 10,573,320 B2
(45) Date of Patent: Feb. 25, 2020

(54) VOICE RECOGNITION COMMUNICATION SYSTEM WITH PRIVACY INTERRUPT DEVICE AND RELATED METHODS

(71) Applicant: Darren Humphrey, Orlando, FL (US)

(72) Inventor: Darren Humphrey, Orlando, FL (US)

( * ) Notice: Subject to any disclaimer, the term of this patent is extended or adjusted under 35 U.S.C. 154(b) by 0 days.

(21) Appl. No.: 15/992,690

(22) Filed: May 30, 2018

(65) Prior Publication Data

US 2019/0371339 A1    Dec. 5, 2019

(51) Int. Cl.
*G10L 15/30* (2013.01)
*H02J 9/06* (2006.01)

(52) U.S. Cl.
CPC ............ *G10L 15/30* (2013.01); *H02J 9/061* (2013.01)

(58) Field of Classification Search
CPC .... H05B 37/0245; H05B 37/02; H04N 5/772; H04N 5/23245; H04N 5/232; H04N 5/23241; G10L 2021/02082; G10L 2021/02166; G10L 21/013; G10L 21/0208; G10L 25/93
See application file for complete search history.

(56) References Cited

U.S. PATENT DOCUMENTS

| | | | |
|---|---|---|---|
| 8,344,667 B1 * | 1/2013 | King | H05B 37/02 315/186 |
| 9,472,206 B2 | 10/2016 | Ady | |
| 9,514,321 B2 | 12/2016 | Cho et al. | |
| 9,614,378 B2 * | 4/2017 | Golko | H01F 7/206 |
| 9,680,983 B1 | 6/2017 | Schuster et al. | |
| 2006/0247919 A1 | 11/2006 | Specht et al. | |
| 2013/0072165 A1 | 3/2013 | Rondeau et al. | |
| 2014/0062340 A1 * | 3/2014 | Elgayyar | H05B 37/0245 315/360 |
| 2016/0225337 A1 | 8/2016 | Ek et al. | |
| 2018/0322870 A1 * | 11/2018 | Lee | G10L 15/22 |

OTHER PUBLICATIONS

"PrivacyShield Sound blocking for your smart speaker" https://getprivacyshield.co Retrieved from internet Mar. 28, 2018; pp. 7.

* cited by examiner

*Primary Examiner* — Huyen X Vo
(74) *Attorney, Agent, or Firm* — Allen, Dyer, Doppelt + Gilchrist, PA

(57) ABSTRACT

A voice recognition communication system may include a voice recognition server, a smart speaker device configured to communicate with the voice recognition server over a network, a power source, and a privacy interrupt device coupled between the smart speaker device and the power source. The privacy interrupt device may include a power switch configured to selectively toggle between a first state where the power source and the smart speaker device are connected and a second state where the power source and the smart speaker device are disconnected, and a visual indicator configured to indicate when the power switch is in the first state.

15 Claims, 3 Drawing Sheets

VOICE RECOGNITION COMMUNICATION SYSTEM WITH PRIVACY INTERRUPT DEVICE AND RELATED METHODS

TECHNICAL FIELD

The present disclosure relates to the field of voice recognition systems, and, more particularly, to voice recognition smart speaker accessory devices and related methods.

BACKGROUND

Speech recognition is an inter-disciplinary sub-field of computational linguistics that develops methodologies and technologies that enable the recognition and translation of spoken language into text by computers. It is also known as "automatic speech recognition" (ASR), "computer speech recognition", or just "speech-to-text" (STT). Early approaches to speech recognition relied heavily on enrollment or training efforts. Although this improved speech recognition accuracy, this made speech input quite limited and cumbersome to use. Speaker independent, i.e. no training, speech recognition systems alleviated some of this concern, but were still limited.

Speech recognition was deployed on mobile wireless communications device, but this application was limited due to the limited computational resources available on the mobile device. This limitation was ever present until the wide deployment of high bandwidth fourth generation wireless networks. With the increased bandwidth and improved reliability of these new networks, it was now practical to quickly upload high quality recorded speech to a main server with sufficient computational resources to perform speech recognition.

As the cloud based voice recognition became ubiquitous, several approaches to the virtual assistant were deployed, for example, the Google Assistant (as available from Alphabet, Inc. of Mountain View, Calif.), Siri (as available from Apple, Inc. of Cupertino, Calif.), and Alexa (as available from Amazon, Inc. of Seattle, Wash.). The virtual assistants were quite helpful, but were limited to the mobile device of the user, which includes a limited battery power, an ill-suited microphone (i.e. ill-suited for receiving any spoken commands outside of a few feet of the mobile device), and a small speaker.

An approach to these limitations is the smart speaker device. The smart speaker device includes a set of high quality microphones, which permits receipt of voice commands spoken at a distance, a wireless transceiver to connect to the Internet, and a grid power source. Basically, the smart speaker provides a stationary interface to the available virtual assistants.

Due to privacy concerns, most smart speakers attempt to only pass voice commands (i.e. audio recordings) to the cloud when activated. The activation method is a spoken activation command, for example, "Alexa", "Siri", or "Hey Google". Nevertheless, even when not activated, the smart speaker is always listening to ambient audio, but with the understanding that recognition of the spoken activation command is entirely local to the smart speaker. Needless to say, although the smart speaker provides convenient access to the virtual assistants, there is great concern regarding user privacy.

SUMMARY

Generally, a voice recognition communication system may include a voice recognition server, a smart speaker device configured to communicate with the voice recognition server over a network, and a power source. The voice recognition communication system may include a privacy interrupt device coupled between the smart speaker device and the power source. The privacy interrupt device may comprise a power switch configured to selectively toggle between a first state where the power source and the smart speaker device are connected and a second state where the power source and the smart speaker device are disconnected, and a visual indicator configured to indicate when the power switch is in the first state.

In particular, the power source may include a power receptacle coupled to an infrastructure power grid, and a power transformer configured to convert an alternating current (AC) power signal from the infrastructure power to a direct current (DC) power signal. The DC power signal may have a voltage between 3V and 15V, for example.

In some embodiments, the privacy interrupt device may comprise a timer circuit coupled to the power switch and configured to measure a set time period. The privacy interrupt device may include a controller, a user switch coupled to the controller, a memory circuit coupled to the controller and configured to store a state of the timer circuit and the power switch, and a battery power source configured to power the memory circuit when the AC power signal is unavailable. Also, the power switch may be configured to, when in the second state and upon a short press activation of the user switch, enter the first state and return to the second state after the set time period has elapsed. The visual indicator may be configured to flash during the set time period at a frequency. The frequency may change inversely with a remaining portion of the set time period. The power switch may be configured to, when in the second state and upon a long press activation of the user switch, enter the first state.

For example, the visual indicator may include a light emitting diode (LED). The privacy interrupt device may include a housing carrying the user switch and the visual indicator on an outer surface thereof.

Another aspect is directed to a privacy interrupt device for a voice recognition communication system. The voice recognition communication system may comprise a voice recognition server, a smart speaker device configured to communicate with the voice recognition server over a network, and a power source. The privacy interrupt device may be coupled between the smart speaker device and the power source. The privacy interrupt device may include a power switch configured to selectively switch between a first state where the power source and the smart speaker device are connected and a second state where the power source and the smart speaker device are disconnected. The privacy interrupt device may comprise a visual indicator configured to indicate when the power switch is in the first state.

Another aspect is directed to a method of making a privacy interrupt device for a voice recognition communication system. The voice recognition communication system may include a voice recognition server, a smart speaker device configured to communicate with the voice recognition server over a network, and a power source. The privacy interrupt device may be coupled between the smart speaker device and the power source. The method may include coupling a power switch to selectively switch between a first state where the power source and the smart speaker device are connected and a second state where the power source and the smart speaker device are disconnected. The method may include coupling a visual indicator to indicate when the power switch is in the first state.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
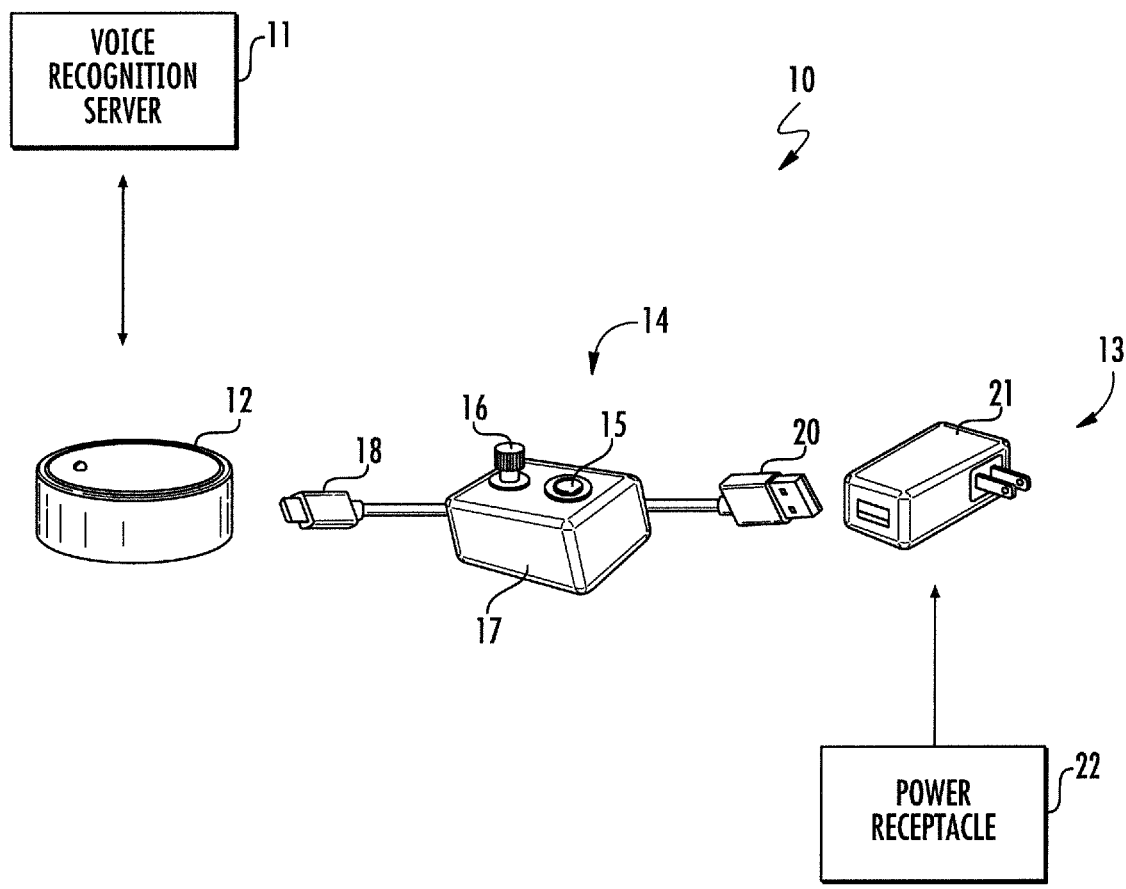
FIG. 1 is a schematic diagram of a voice recognition communication system, according to the present disclosure.
Figure 2:
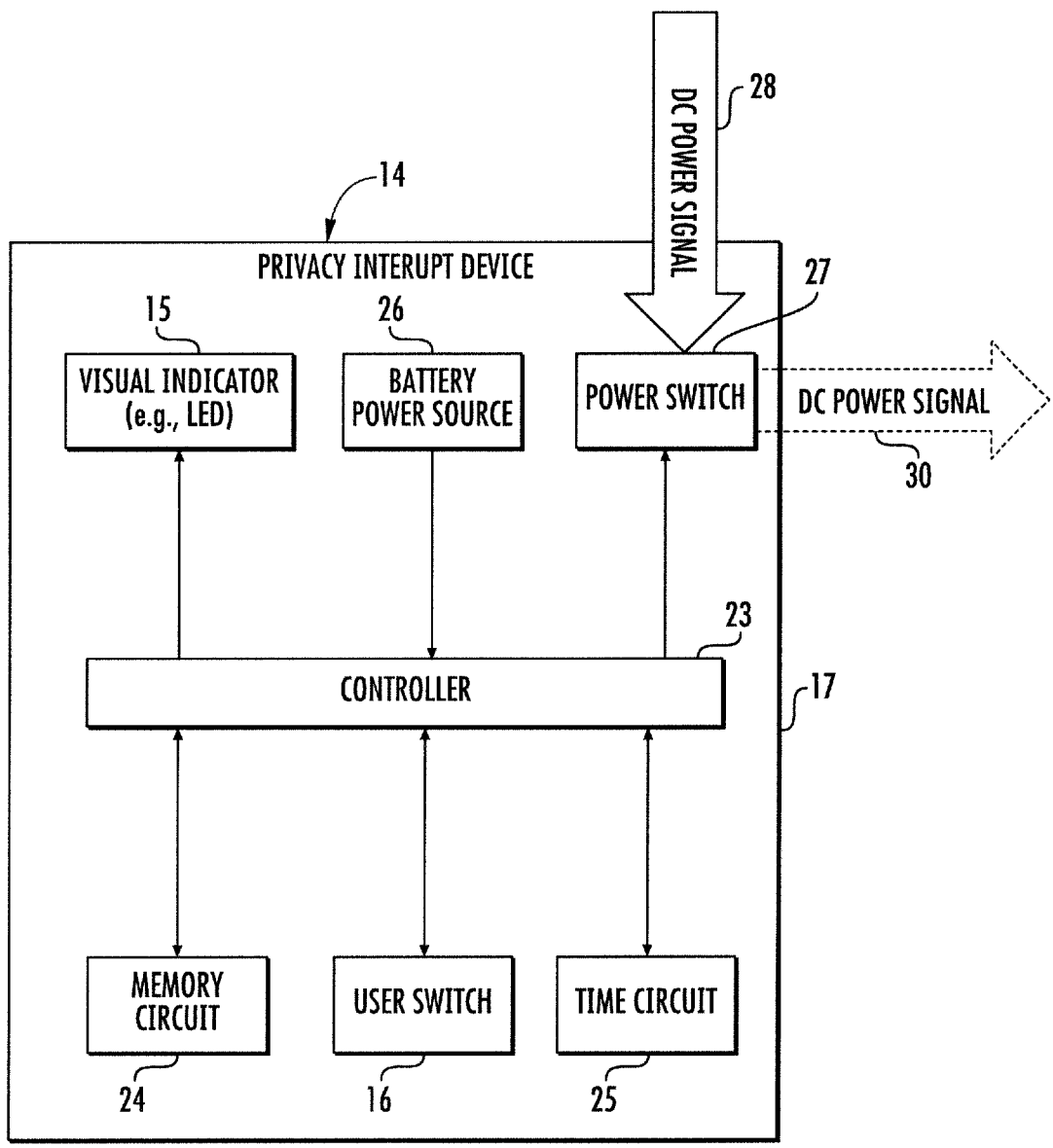
FIG. 2 is a schematic diagram of the privacy interrupt device from the voice recognition communication system of FIG. 1.
Figure 3:
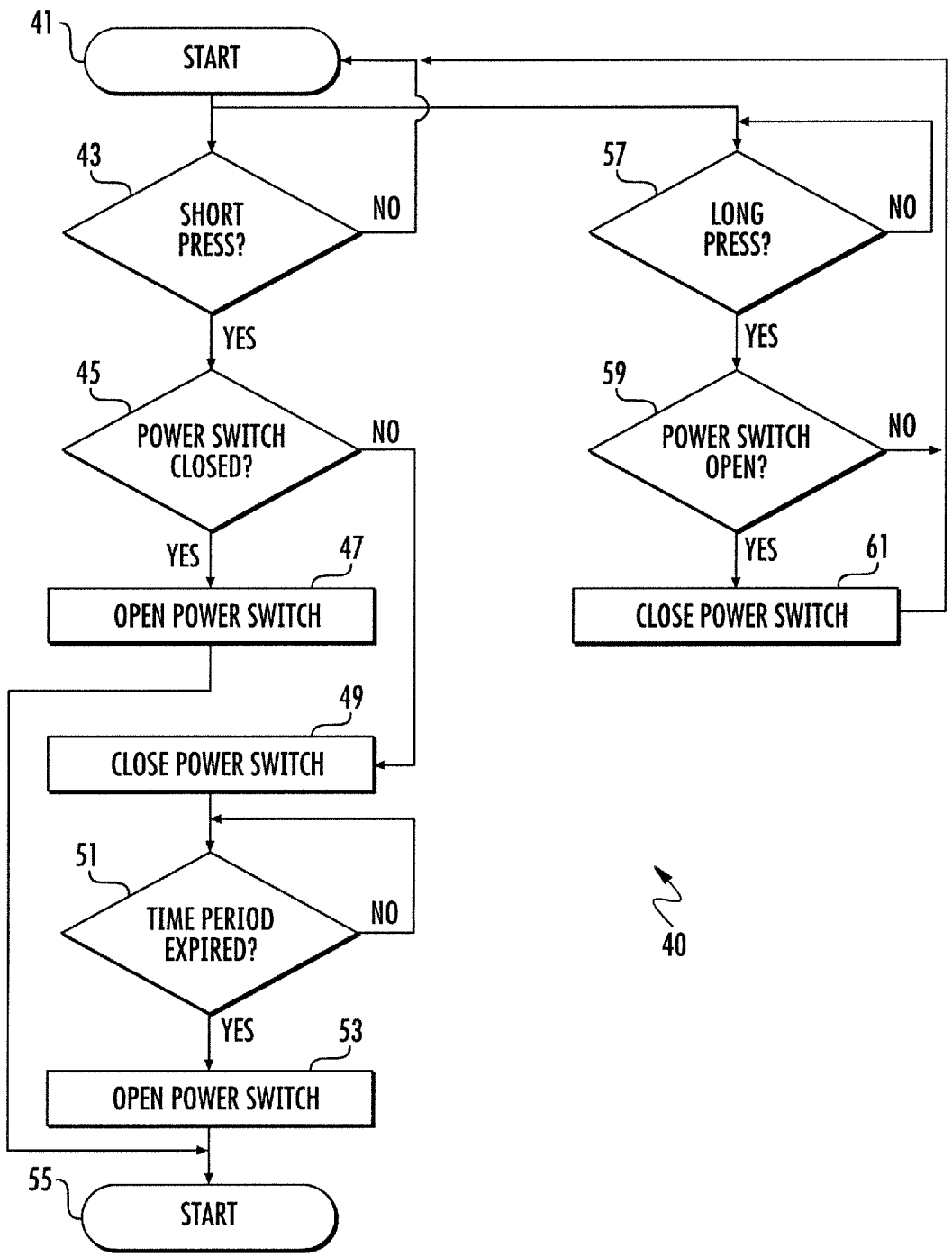
FIG. 3 is a method of operating the privacy interrupt device of FIG. 2.

Referring initially to FIGS. 1-2, a voice recognition communication system 10 according to the present disclosure is now described. Also, with additional reference to FIG. 3, a method of operating one or more components of the voice recognition communication system 10 is also described with a flowchart 40. The voice recognition communication system 10 illustratively includes a voice recognition server 11, and a smart speaker device 12 configured to communicate with the voice recognition server over a network (e.g. the Internet, or a closed local area network (LAN)). As will be appreciated, the smart speaker device 12 is any powered speaker device with advanced functionality. In some embodiments, the advanced functionality comprises a voice interface to a cloud computing based virtual assistant, for example, the Google Assistant/Google Home (as available from Alphabet, Inc. of Mountain View, Calif.), the Siri/Homepod (as available from Apple, Inc. of Cupertino, Calif.), and the Alexa/Echo (as available from Amazon, Inc. of Seattle, Wash.).

The voice recognition communication system 10 illustratively includes a power source 13. The power source 13 illustratively includes a power receptacle 22 coupled to an infrastructure power grid (not shown) providing an AC power signal. The AC power signal may comprise a power signal having a frequency between 40 Hz and 75 Hz and a signal level between 90 Volts and 260 Volts, such as 120 Volts at 60 Hz (US standard), or 230 Volts at 50 Hz (European standard).

The power source 13 illustratively includes a power transformer 21 configured to convert the AC power signal from the infrastructure power to a DC power signal 28. The DC power signal may have a voltage between 3 Volts and 15 Volts, and a current between 1 Amp and 5 Amps, for example.

The voice recognition communication system 10 illustratively includes a privacy interrupt device 14 (i.e. a privacy enhancing device, a privacy cutoff device, or a selective power supply device) coupled between the smart speaker device 12 and the power source 13. The privacy interrupt device 14 illustratively includes first and second connections 18, 20. The first connection 18 is coupled to the smart speaker device 12 via a power adapter coupling (e.g. a DC power connector). The second connection 20 is coupled to the power transformer 21. Each of the first and second connections 18, 20 illustratively includes a universal serial bus (USB), such as the exemplary Standard-A USE 3.0 connector. Of course, in other embodiments, the first and second connections may comprise other cable formats capable of transmitting the DC power signal or the AC power signal in some embodiments.

The privacy interrupt device 14 illustratively includes a power switch 27 coupled between the first and second connections 18, 20 and configured to selectively transmit the DC power signal 30 from the second connection to the first connection. The power switch 27 may comprise a single pole single throw switch in some embodiments.

In another embodiment (not shown), the power transformer 21 is integrated within the smart speaker device 12. In this embodiment, the power switch 27 is configured to route the AC power signal through the privacy interrupt device 14.

The power switch 27 is configured to selectively toggle between first and second states. The first state is where the power source 13 and the smart speaker device 12 are connected (i.e. the power switch is closed, providing a powered on state for the smart speaker device). The second state is where the power source 13 and the smart speaker device 12 are disconnected (i.e. the power switch is open, providing a powered off state for the smart speaker device). The privacy interrupt device 14 illustratively includes a visual indicator 15 configured to indicate when the power switch 27 is in the first state (i.e. indicating when the smart speaker device 12 is in a powered on state and recording audio, creating a privacy concern). For example, the visual indicator 15 may include a multicolor light emitting diode (LED) circuit, using different colors to indicate whether the power switch 27 is in the first state or the second state.

The privacy interrupt device 14 illustratively includes a timer circuit 25 coupled to the power switch 27 and configured to measure a set time period (e.g. 2-15 minutes). The privacy interrupt device 14 illustratively includes a controller 23, and a user switch 16 coupled to the controller. For example, the user switch 16 illustratively includes a push button switch.

The privacy interrupt device 14 illustratively includes a memory circuit 24 coupled to the controller 23 and configured to store a state of the timer circuit 25 and the power switch 27. The privacy interrupt device 14 illustratively includes a battery power source 26 configured to power the memory circuit 24 when the AC power signal is unavailable. The battery power source 26 may comprise a lithium ion battery, or in other embodiments, a capacitor. Helpfully, when power outages occur, the privacy interrupt device 14 is able to return to the prior state when power is again available. In some embodiments, the memory circuit 24 may comprise persistent memory (e.g. flash memory) and the battery power source 26 may be omitted.

Also, the controller 23 is configured to cause the power switch 27 to, when in the second state and upon a short press activation (e.g. less than 2 seconds in duration) of the user switch 16, enter the first state and return to the second state after the set time period has elapsed. (Blocks 41, 43, 45, 47, 49, 51, 53, 55). The visual indicator 15 is configured to flash during the set time period at a frequency. The frequency changes inversely with a remaining portion of the set time period. In other words, as the set time period elapses, the visual indicator 15 flashes more rapidly, thereby notifying the user of the impending shutdown of the smart speaker device 12. The controller 23 is configured to cause the power switch 27 to, when in the second state and upon a long press activation (e.g. greater than 2 seconds in duration) of the user switch 16, enter the first state indefinitely. (Blocks 57,

59, 61, 55). Of course, these functionalities are merely illustrative, and the short press/long press commands could be inverted in their assigned commands.

The privacy interrupt device 14 illustratively includes a housing 17 carrying the user switch 16 and the visual indicator 15 on an outer surface thereof. Of course, the other components of the privacy interrupt device 14 are carried internally (i.e. the battery power source 26, the power switch 27, the memory circuit, and the timer circuit 25).

Although not illustrated, the privacy interrupt device 14 may include a power circuit to provide power for onboard components from the DC power signal 28. Also, the privacy interrupt device 14 may provide for programming of the set time period via the USB interface of the first and second connections 18, 20. In these embodiments, the first and second connections 18, 20 would be plugged into a host system, and the host system would have access to the memory circuit 24. Indeed, the input interface (i.e. the functions of the long and short presses) of the user switch 16 may be changed via this same process.

In another embodiment, the privacy interrupt device 14 may include a wireless transceiver coupled to the controller 23, for example, a Bluetooth transceiver, a ZigBee transceiver (IEEE 802.15.4), a WiFi transceiver (IEEE 802.11x), a near field communications (NFC) transceiver, or an infrared transceiver. In this embodiment, some users may desire that the smart speaker device 12 be permanently disabled when the user is within range. Leveraging the users' associated mobile devices (e.g. cellular phones, tablet computing devices, wearable smart devices, such as a smart watch), the privacy interrupt device 14 would detect the presence of the associated mobile devices, and automatically cause the power switch 27 to enter the second state (i.e. causing an automatic shutdown of the smart speaker device 12). In some embodiments, the privacy interrupt device 14 may detect an identification token from the mobile devices without a formal pairing process, and may disable the smart speaker device 12 with no user intervention. In these embodiments, the memory circuit 24 would store the identification tokens of the desired mobile devices.

In these same embodiments, the mobile device of the user could include alternatively (to the embodiment of FIGS. 1-2) the visual indicator 15 or include a supplemental visual indicator (not shown). In other words, the mobile device would natively provide the visual indicator 15 via an onboard operating system feature, such as providing it as a system notification. In the mobile device embodiments, the user switch 16 may be omitted since it would be supplementary in nature.

In another embodiment, the privacy interrupt device 14 includes a software conduit to the smart speaker device 12. In other words, the privacy interrupt device 14 is configured to interface with the associated virtual assistant via the appropriate software developer kit (SDK), and the user may pass voice commands to the privacy interrupt device 14 via the virtual assistant. Advantageously, the user could activate the smart speaker device 12 and ask it to command (via the appropriate SDK) the privacy interrupt device 14 to cause the power switch 27 to enter the second state permanently or for a desired time period (i.e. "Hey Google, please go secure/private for N minutes." or "Hey Google, please go secure/private indefinitely.").

In other words, the voice command would include a command to control the set time period of the timer circuit 25. Of course, since the smart speaker device 12 would be unpowered, the user would need to set a time limit to repower the smart speaker device, or manually cause the power switch 27 to reenter the first state (i.e. by pressing the user switch 16).

Another aspect is directed to a privacy interrupt device 14 for a voice recognition communication system 10 comprising a voice recognition server 11, a smart speaker device 12 configured to communicate with the voice recognition server over a network, and a power source 13. The privacy interrupt device 14 is to be coupled between the smart speaker device 12 and the power source 13. The privacy interrupt device 14 includes a power switch 27 configured to selectively switch between a first state where the power source 13 and the smart speaker device 12 are connected and a second state where the power source and the smart speaker device are disconnected. The privacy interrupt device 14 comprises a visual indicator 15 configured to indicate when the power switch 27 is in the first state.

Another aspect is directed to a method of making a privacy interrupt device 14 for a voice recognition communication system 10. The voice recognition communication system 10 includes a voice recognition server 11, a smart speaker device 12 configured to communicate with the voice recognition server over a network, and a power source 13. The privacy interrupt device 14 is to be coupled between the smart speaker device 12 and the power source 13. The method includes coupling a power switch 27 to selectively switch between a first state where the power source 13 and the smart speaker device 12 are connected and a second state where the power source and the smart speaker device are disconnected. The method includes coupling a visual indicator 15 to indicate when the power switch 27 is in the first state.

Advantageously, the privacy interrupt device 14 may provide for controlled and verified privacy when in the presence of the smart speaker device 12. As will appreciated by those skilled in the art, typical smart speaker devices include a "hardware" mute button to silence the onboard microphone, but the operation of function is software based and subject to frequent malfunction. Moreover, there have been instances where the typical smart speaker devices may record even when the mute is engaged, and when the typical smart speaker devices are not activated. The privacy interrupt device 14 provides an elegant approach to these problems but providing an external mute functionality that does not rely on software, nor any internal component within the smart speaker device.

Indeed, the smart speaker device 12 is simply powered off. Also, the privacy interrupt device 14 is quite flexible in control. The user may simply activate the user switch 16, use wireless communications (in some embodiments) for automatic privacy mode, or use the virtual assistant to enter the privacy mode.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A voice recognition communication system comprising:
   a voice recognition server;
   a smart speaker device configured to communicate with said voice recognition server over a network;

a power source separate from said smart speaker device and comprising a power receptacle coupled to an infrastructure power grid, and a power transformer configured to convert an alternating current (AC) power signal from the infrastructure power grid to a direct current (DC) power signal; and a privacy interrupt device coupled between said smart speaker device and said power source and comprising a housing separate from said smart speaker device, first and second connections carried by said housing, said first connection coupled to said smart speaker device to deliver the DC power signal to said smart speaker device, said second connection coupled to said power transformer and configured to receive the AC power signal, a power switch carried by said housing and coupled between said first and second connections, said power switch configured to selectively toggle between a first state where said power source and said smart speaker device are connected and a second state where said power source and said smart speaker device are disconnected, a visual indicator carried by said housing and configured to indicate when said power switch is in the first state, a timer circuit coupled to said power switch and configured to measure a set time period, a controller, a user switch coupled to said controller, a memory circuit coupled to said controller and configured to store a state of said timer circuit and said power switch, and a battery power source configured to power said memory circuit when the AC power signal is unavailable, said power switch configured to, when in the second state and upon a short press activation of said user switch, enter the first state and return to the second state after the set time period has elapsed, said visual indicator configured to flash during the set time period at a frequency, the frequency changes inversely with a remaining portion of the set time period.

2. The voice recognition communication system of claim 1 wherein the DC power signal has a voltage between 3V and 15V.

3. The voice recognition communication system of claim 1 wherein said power switch is configured to, when in the second state and upon a long press activation of said user switch, enter the first state.

4. The voice recognition communication system of claim 1 wherein said visual indicator comprises a light emitting diode (LED).

5. The voice recognition communication system of claim 1 said housing is carrying said user switch and said visual indicator on an outer surface thereof.

6. A privacy interrupt device for a voice recognition communication system comprising a voice recognition server, a smart speaker device configured to communicate with the voice recognition server over a network, and a power source separate from the smart speaker device and comprising a power receptacle coupled to an infrastructure power grid, and a power transformer configured to convert an alternating current (AC) power signal from the infrastructure power grid to a direct current (DC) power signal, the privacy interrupt device to be coupled between the smart speaker device and the power source, the privacy interrupt device comprising:

a housing separate from the smart speaker device;

first and second connections carried by said housing, said first connection coupled to the smart speaker device to deliver the DC power signal to the smart speaker device, said second connection coupled to the power transformer and configured to receive the AC power signal;

a user switch;

a power switch carried by said housing and coupled between said first and second connections, said power switch configured to selectively switch between a first state where the power source and the smart speaker device are connected and a second state where the power source and the smart speaker device are disconnected, and upon a short press activation of said user switch, switch between the first state and the second state, and return to a prior state after a set time period has elapsed; and a visual indicator carried by said housing and configured to indicate when said power switch is in the first state, and flash during the set time period at a frequency, the frequency changes inversely with a remaining portion of the set time period.

7. The privacy interrupt device of claim 6 further comprising a timer circuit coupled to said power switch and configured to measure the set time period.

8. The privacy interrupt device of claim 7 further comprising:

a controller coupled to said a user switch;

a memory circuit coupled to said controller and configured to store a state of said timer circuit and said power switch; and a battery power source configured to power said memory circuit when an alternating current (AC) power signal is unavailable.

9. The privacy interrupt device of claim 6 wherein said power switch is configured to, when in the second state and upon a long press activation of said user switch, enter the first state.

10. The privacy interrupt device of claim 6 wherein said housing is carrying said user switch and said visual indicator on an outer surface thereof.

11. A method of making a privacy interrupt device for a voice recognition communication system comprising a voice recognition server, a smart speaker device configured to communicate with the voice recognition server over a network, and a power source separate from the smart speaker device and comprising a power receptacle coupled to an infrastructure power grid, and a power transformer configured to convert an alternating current (AC) power signal from the infrastructure power grid to a direct current (DC) power signal, the privacy interrupt device to be coupled between the smart speaker device and the power source, the method comprising:

providing a housing separate from the smart speaker device;

providing first and second connections carried by the housing, the first connection coupled to the smart speaker device to deliver the DC power signal to the smart speaker device, the second connection coupled to the power transformer and configured to receive the AC power signal;

coupling a user switch carried by the housing;
coupling a power switch between the first and second connections and carried by the housing, the power switch to
- selectively switch between a first state where the power source and the smart speaker device are connected and a second state where the power source and the smart speaker device are disconnected, and
- upon a short press activation of the user switch, switch between the first state and the second state, and return to a prior state after a set time period has elapsed; and coupling a visual indicator carried by the housing and to
- indicate when the power switch is in the first state, and
- flash during the set time period at a frequency, the frequency changes inversely with a remaining portion of the set time period.

12. The method of claim 11 further comprising coupling a timer circuit to the power switch and to measure the set time period.

13. The method of claim 12 further comprising:
providing a controller;
coupling the user switch to the controller;
coupling a memory circuit to the controller and to store a state of the timer circuit and the power switch; and
coupling a battery power source to power the memory circuit when an alternating current (AC) power signal is unavailable.

14. A voice recognition communication system comprising:
a voice recognition server;
a smart speaker device configured to communicate with said voice recognition server over a network;
a power source; and
a privacy interrupt device coupled between said smart speaker device and said power source and comprising
a user switch,
a power switch configured to
- selectively toggle between a first state where said power source and said smart speaker device are connected and a second state where said power source and said smart speaker device are disconnected, and
- upon a short press activation of said user switch, switch between the first state and the second state, and return to a prior state after a set time period has elapsed, and a visual indicator configured to
- indicate when said power switch is in the first state, and
- flash during the set time period at a frequency, the frequency changes inversely with a remaining portion of the set time period.

15. The voice recognition communication system of claim 14 wherein said power source is separate from said smart speaker device and comprises a power receptacle coupled to an infrastructure power grid, and a power transformer configured to convert an alternating current (AC) power signal from the infrastructure power grid to a direct current (DC) power signal; wherein said privacy interrupt device comprises a housing separate from said smart speaker device, first and second connections carried by said housing, said first connection coupled to said smart speaker device to deliver the DC power signal to said smart speaker device, said second connection coupled to said power transformer and configured to receive the AC power signal; wherein said power switch is carried by said housing and coupled between said first and second connections; and wherein said visual indicator is carried by said housing.

* * * * *